US012712803B2

(12) United States Patent
Yang

(10) Patent No.: US 12,712,803 B2
(45) Date of Patent: Aug. 18, 2026

(54) APPLICATION ACCESS METHOD, CLOUD PROXY COMPONENT, NODE PROXY COMPONENT, DEVICE AND MEDIUM

(71) Applicant: SUZHOU METABRAIN INTELLIGENT TECHNOLOGY CO., LTD., Suzhou (CN)

(72) Inventor: Yong Yang, Suzhou (CN)

(73) Assignee: SUZHOU METABRAIN INTELLIGENT TECHNOLOGY CO., LTD., Suzhou (CN)

(*) Notice: Subject to any disclaimer, the term of this patent is extended or adjusted under 35 U.S.C. 154(b) by 87 days.

(21) Appl. No.: 18/704,904

(22) PCT Filed: Sep. 27, 2022

(86) PCT No.: PCT/CN2022/121851

§ 371 (c)(1),
(2) Date: Apr. 25, 2024

(87) PCT Pub. No.: WO2023/173720

PCT Pub. Date: Sep. 21, 2023

(65) Prior Publication Data

US 2025/0007815 A1 Jan. 2, 2025

(30) Foreign Application Priority Data

Mar. 17, 2022 (CN) ......................... 202210260957.4

(51) Int. Cl.

| | |
|---|---|
| ***G06F 15/173*** | (2006.01) |
| ***H04L 45/036*** | (2022.01) |
| ***H04L 45/745*** | (2022.01) |
| ***H04L 61/2514*** | (2022.01) |
| ***H04L 61/2585*** | (2022.01) |
| ***H04L 67/51*** | (2022.01) |
| ***H04L 67/564*** | (2022.01) |

(52) U.S. Cl.

CPC .......... *H04L 45/036* (2022.05); *H04L 45/745* (2013.01); *H04L 61/2514* (2013.01);
(Continued)

(58) Field of Classification Search

CPC . H04L 45/036; H04L 45/037; H04L 45/0377; H04L 45/02; H04L 67/51;
(Continued)

(56) References Cited

U.S. PATENT DOCUMENTS

| | | | | |
|---|---|---|---|---|
| 2008/0080490 A1* | 4/2008 | Ito | H04L 12/42 370/362 |
| 2009/0043911 A1* | 2/2009 | Flammer | H04W 40/02 709/238 |

(Continued)

FOREIGN PATENT DOCUMENTS

| | | |
|---|---|---|
| CN | 109479065 A | 3/2019 |
| CN | 112751913 A | 5/2021 |

(Continued)

*Primary Examiner* — Kaylee J Huang

(74) *Attorney, Agent, or Firm* — IPro, PLLC

(57) ABSTRACT

An application access method includes: acquiring a node discovery result; in response to the node discovery result indicating that no node is discovered, performing a user datagram protocol (UDP) hole punching operation between a local area network where a newly registered edge node is located and a current existing local area network to obtain an intercommunication relationship between the local area networks, and updating a global routing table based on the intercommunication relationship; in response to the node discovery result indicating that a node is successfully discovered, associating node information of the newly registered edge node with target local area network information to update the global routing table; and issuing the global routing table to a node proxy component in each edge node, so that the node proxy component in each edge node forwards an application access flow based on the global routing table to realize application access.

18 Claims, 7 Drawing Sheets

(52) U.S. Cl.
CPC .......... *H04L 61/2585* (2013.01); *H04L 67/51* (2022.05); *H04L 67/564* (2022.05)

(58) Field of Classification Search
CPC . H04L 67/564; H04L 45/745; H04L 45/7452; H04L 45/7459; H04L 61/2514; H04L 61/2585
USPC ................................. 709/238, 240, 217, 223
See application file for complete search history.

(56) References Cited

U.S. PATENT DOCUMENTS

| | | | | |
|---|---|---|---|---|
| 2010/0131636 | A1* | 5/2010 | Suri | H04L 45/22<br>709/224 |
| 2012/0113977 | A1* | 5/2012 | Shimoosawa | H04L 61/2575<br>370/352 |
| 2014/0029610 | A1 | 1/2014 | Vasseur et al. | |
| 2019/0052561 | A1* | 2/2019 | Osborne | H04L 45/745 |
| 2019/0102293 | A1* | 4/2019 | Li | G06F 3/065 |
| 2021/0058300 | A1* | 2/2021 | Kärkkäinen | H04L 41/0893 |

FOREIGN PATENT DOCUMENTS

| | | | |
|---|---|---|---|
| CN | 112887452 | A | 6/2021 |
| CN | 113055469 | A | 6/2021 |
| CN | 113726843 | A | 11/2021 |
| CN | 114064206 | A | 2/2022 |
| CN | 114363410 | A | 4/2022 |
| WO | 2013120512 | A1 | 8/2013 |

* cited by examiner

APPLICATION ACCESS METHOD, CLOUD PROXY COMPONENT, NODE PROXY COMPONENT, DEVICE AND MEDIUM

CROSS-REFERENCE TO RELATED APPLICATIONS

The present application claims the priority of the Chinese patent application filed on Mar. 17, 2022 before the CNIPA, China National Intellectual Property Administration with the application number of 202210260957.4 and the title of "APPLICATION ACCESS METHOD, CLOUD PROXY COMPONENT, NODE PROXY COMPONENT, DEVICE AND MEDIUM", which is incorporated herein in its entirety by reference.

FIELD

The present application relates to the technical field of cloud services and more particularly, to an application access method, a cloud proxy component, a node proxy component, a device and a medium.

BACKGROUND

In a traditional k8s cluster, cluster nodes are interconnected with each other, and applications access each other through a service object of k8s, which is an example of a well-structured distributed system. After a service is created, a label is used to match a back-end pod (a set of collocated containers), and a kube-proxy (a network proxy component) configures a local iptables (an information packet filtering system) rule and forwards a flow directed to a service Internet Protocol (ip) to a back-end pod ip. When the pod crosses nodes, it relies on cni (i.e., container network interface) to build a pod network based on a node network. However, in a k8s-based edge computing scenario, a common situation is that a control node that carries an edge computing k8s cluster is deployed on a public network and exposes a public network ip to the outside, computing nodes are distributed in different sites and different local area networks, nodes in the same local area network are interconnected with each other, and nodes across the networks may not directly communicate with each other, but nodes in all the local area networks may communicate with the public network ip exposed by the control node. In this network topology, application pods across the local area networks may not communicate with each other through traditional k8s service+cni.

SUMMARY

In view of this, an object of the present application is to provide an application access method, cloud proxy and node proxy components, a device and a medium, which may realize application access across edge nodes and reduce a load of centralized flow proxies. The solutions are as follows.

In a first aspect, the present application discloses an application access method, which is applied to a cloud proxy component and includes:

acquiring a node discovery result, the node discovery result being a node discovery result obtained by a node proxy component in a newly registered edge node to perform node discovery on each edge node in a current cluster;

in response to the node discovery result indicating that no node is discovered, performing a user datagram protocol (UDP) hole punching operation between a local area network where the newly registered edge node is located and a current existing local area network to obtain an intercommunication relationship between the local area networks, and updating a global routing table based on the intercommunication relationship;

in response to the node discovery result indicating that a node is successfully discovered, associating node information of the newly registered edge node with target local area network information to update the global routing table, the target local area network information being local area network information of a local area network where a successfully discovered node is located; and issuing the global routing table to a node proxy component in each edge node, so that the node proxy component in each edge node forwards an application access flow based on the global routing table to realize application access.

In some embodiments of the present application, before acquiring the node discovery result, the application access method further includes:

issuing a cluster node list to the node proxy component in the newly registered edge node, so that the node proxy component performs node discovery on each edge node in the current cluster based on the cluster node list, to obtain the node discovery result.

In some embodiments of the present application, further including:

acquiring node information of the newly registered edge node sent by the node proxy component in the newly registered edge node; and adding the node information to the cluster node list.

In some embodiments of the present application, the node information includes a service discovery port of the node proxy component; and correspondingly, the node proxy component accesses each edge node in the current cluster based on the service discovery port of the node proxy component of each edge node in the cluster node list.

In some embodiments of the present application, in response to the node discovery result indicating that no node is discovered, the application access method further includes:

acquiring a public network network address translation (NAT) gateway address of the local area network where the newly registered edge node is located; and creating local area network information of the local area network based on the public network NAT gateway address and the node information of the newly registered edge node.

In some embodiments of the present application, in response to the node proxy component in each edge node determining based on the global routing table that a local area network where a local node is located and a local area network where a destination node is located are of the same local area network, the application access flow is directly forwarded to the node proxy component in the destination node, so that the node proxy component in the destination node forwards the application access flow to a destination application; and in response to the node proxy component in each edge node determining based on the global routing table that an intercommunication relationship between the local area network where the local node is located and the local area network where the destination node is located may be capable of intercommunication through UDP hole punching, the application access flow is forwarded to the node proxy component in the destination node through a NAT gateway of the local area network where the destination node is located, so that the node proxy component in the destination node forwards the application access flow to the destination application.

In some embodiments of the present application, further including:

maintaining a long link with the node proxy component in each edge node;

acquiring an application access flow sent by a target node proxy component based on the long link, and forwarding the application access flow to the node proxy component in a destination node, so that the node proxy component in the destination node forwards the application access flow to a destination application;

wherein the target node proxy component is a node proxy component that determines based on the global routing table that the intercommunication relationship between a local area network where a local node is located and a local area network where the destination node is located may be uncapable of intercommunication through UDP hole punching.

In a second aspect, the present application discloses an application access method, which is applied to a node proxy component and includes:

during node registration of a local node, performing node discovery on each edge node in a current cluster to obtain a node discovery result;

sending the node discovery result to a cloud proxy component, so that the cloud proxy component updates a global routing table based on the node discovery result, wherein in response to the node discovery result indicating that no node is discovered, the cloud proxy component performs a UDP hole punching operation between a local area network where a newly registered edge node is located and a current existing local area network to obtain an intercommunication relationship between the local area networks, and updates the global routing table based on the intercommunication relationship; in response to the node discovery result indicating that a node is successfully discovered, the cloud proxy component associates node information of the newly registered edge node with target local area network information to update the global routing table, the target local area network information is local area network information of a local area network where a successfully discovered node is located; and acquiring the global routing table issued by the cloud proxy component, and forwarding an application access flow based on the global routing table to realize application access.

In a third aspect, the present application discloses a cloud proxy component, including:

a node discovery result acquiring module, configured to acquire a node discovery result, wherein the node discovery result is a node discovery result obtained by a node proxy component in a newly registered edge node to perform node discovery on each edge node in a current cluster;

a global routing table updating module, configured to, in response to the node discovery result indicating that no node is discovered, perform a UDP hole punching operation between a local area network where the newly registered edge node is located and a current existing local area network to obtain an intercommunication relationship between the local area networks and update a global routing table based on the intercommunication relationship; and in response to the node discovery result indicating that a node is successfully discovered, associate node information of the newly registered edge node with target local area network information to update the global routing table, wherein the target local area network information is local area network information of a local area network where a successfully discovered node is located; and a global routing table issuing module, configured to issue the global routing table to a node proxy component in each edge node, so that the node proxy component in each edge node forwards an application access flow based on the global routing table to realize application access.

In a fourth aspect, the present application discloses a node proxy component, including:

a node discovery module, configured to, during node registration of a local node, perform node discovery on each edge node in a current cluster to obtain a node discovery result;

a node discovery result sending module, configured to send the node discovery result to a cloud proxy component, so that the cloud proxy component updates a global routing table based on the node discovery result, wherein in response to the node discovery result indicating that no node is discovered, the cloud proxy component performs a UDP hole punching operation between a local area network where a newly registered edge node is located and a current existing local area network to obtain an intercommunication relationship between the local area networks, and updates a global routing table based on the intercommunication relationship; and in response to the node discovery result indicating that a node is successfully discovered, the cloud proxy assembly associates node information of the newly registered edge node with target local area network information to update the global routing table, the target local area network information is local area network information of a local area network where a successfully discovered node is located; and a global routing table acquiring module, configured to acquire the global routing table issued by the cloud proxy component, and forward an application access flow based on the global routing table to realize application access.

In a fifth aspect, the present application discloses an electronic device, including a processor and a memory, wherein the memory is configured to store a computer program; and the processor is configured to, when executing the computer program, implement the application access method described above.

In a sixth aspect, the present application discloses a non-transitory computer-readable storage medium, configured to store a computer program therein, wherein the computer program, when being executed by a processor, implementing the application access method described above.

BRIEF DESCRIPTION OF THE DRAWINGS

In order to provide a clearer explanation of technical solutions in the embodiments of the present application or in prior art, a brief introduction will be made to the accompanying drawings required in description of the embodiments or prior art. It is evident that the accompanying drawings in the following description are only embodiments of the present application. For those skilled in the art, other accompanying drawings may be obtained based on the provided drawings without creative labor.

DETAILED DESCRIPTION OF THE EMBODIMENTS

The following will provide a clear and complete description of the technical solution in the embodiments of the present application, in conjunction with the accompanying drawings. Obviously, the described embodiments are only a part of the embodiments of the present application, not all of them. Based on the embodiments in the present application, all other embodiments obtained by persons skilled in the art without creative labor fall within the scope of protection of the present application.

Figure 1:
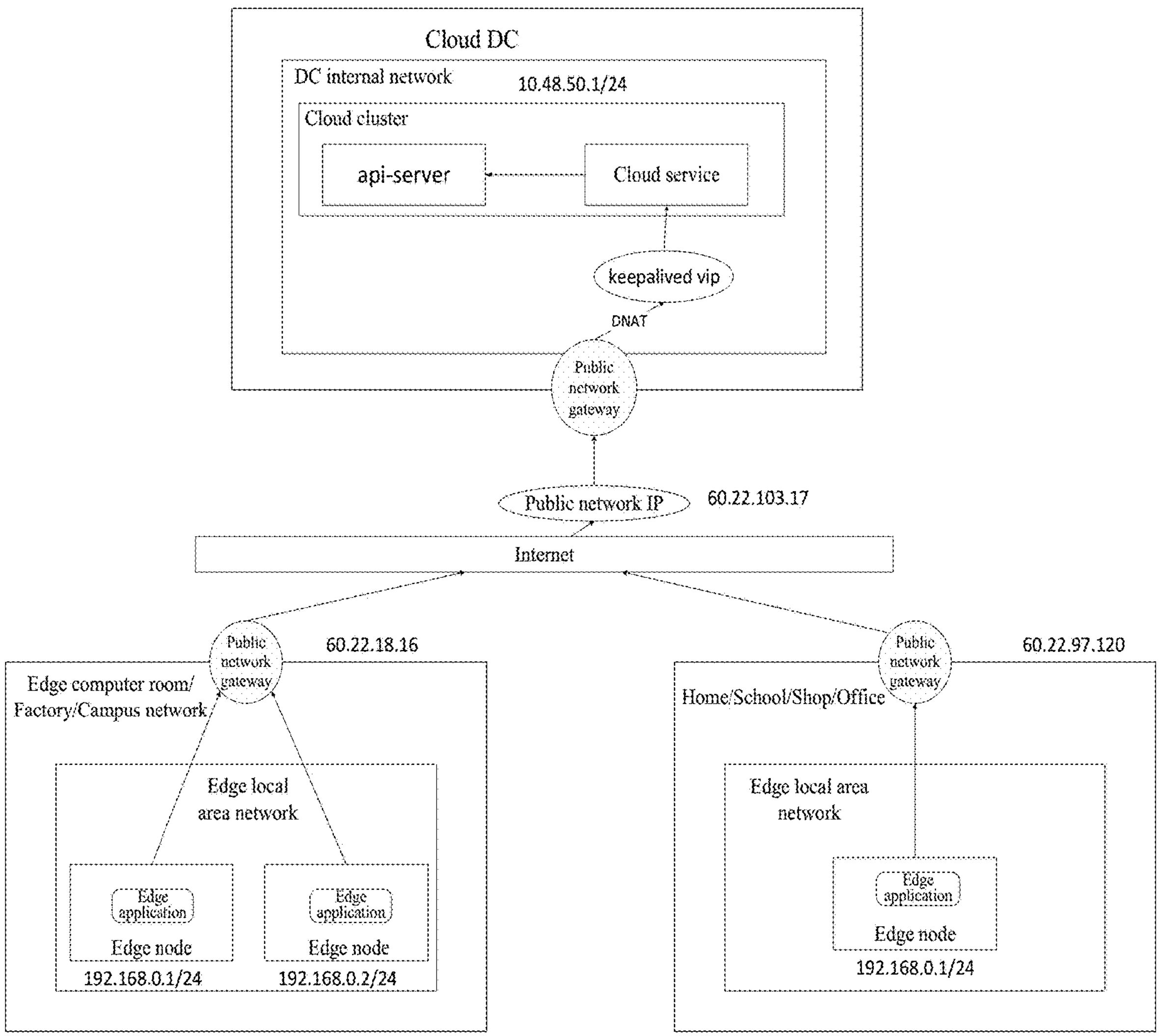
FIG. 1 is a schematic diagram of an edge computing network provided by the present application.

In a native Kubernetes network, each Pod has a unique IP address. It is assumed that all Pods may be in a directly connected, flat network space. In an edge scenario, opening up a container network plane between a cloud center and an edge data center leads to high overhead and low performances. However, an access link between a service deployed in the edge data center and a cloud edge is limited and specified, and has a demand also smaller than a Pod inter-access demand inside the edge data center. In the edge scenario, container networks each converge in each data center and use a high-availability public network gateway+ public network IP to expose an edge service. Another factor that determines a plane scope of the container network is a node network. The container network is based on the node network. For 100+ widely distributed data centers across the country, opening up a node network across regions, which is either a dedicated network line or a VPN, brings a huge overhead. Therefore, under normal circumstances, node networks inside each data center (cloud+edge) are reliable and connected, node networks between data centers are unreliable and not directly connected, an inter-access demand between the data centers depends on a public network gateway of each data center. For example, as shown in FIG. 1, FIG. 1 is a schematic diagram of an edge computing network provided by an embodiment of the present application. Here, api-server is a module configured to provide an external api service in a k8s cluster.

At present, how to realize application access across edge nodes and reduce a load of centralized flow proxies is a problem that needs to be solved. In view of this, the present application provides an application access scheme, which may realize application access across edge nodes and reduce a load of the centralized flow proxies.

Figure 2:
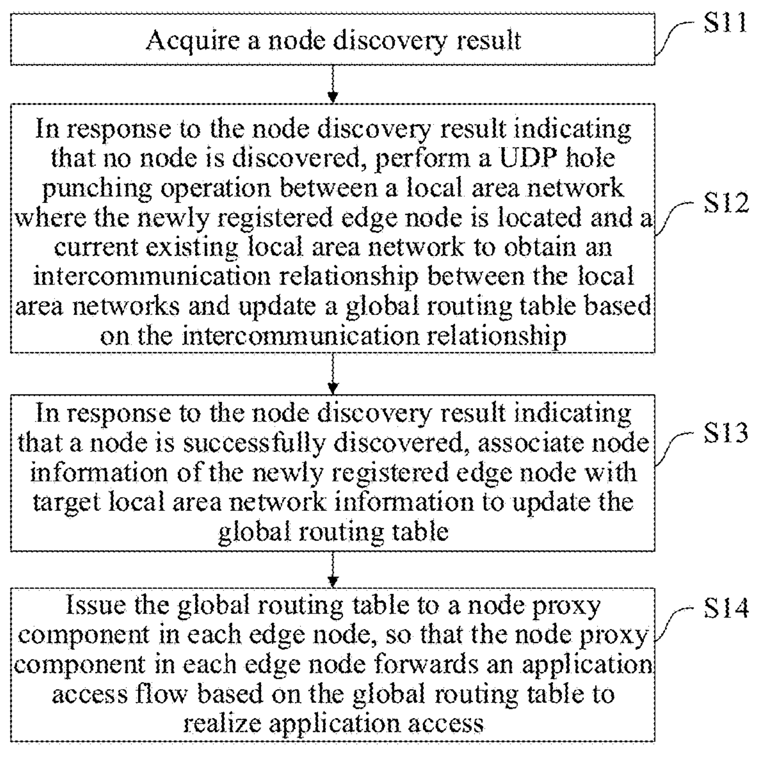
FIG. 2 is a flow chart of an application access method provided by the present application.

As shown in FIG. 2, an embodiment of the present application discloses an application access method, which is applied to a cloud proxy component and includes the following steps.

Step S11: acquiring a node discovery result, wherein the node discovery result is a node discovery result obtained by a node proxy component in a newly registered edge node to perform node discovery on each edge node in a current cluster.

In an implementation, a cluster node list may be issued to the node proxy component in the newly registered edge node, so that the node proxy component performs node discovery on each edge node in the current cluster based on the cluster node list, to obtain the node discovery result; and the node discovery result returned by the node proxy component in the newly registered edge node is acquired.

In addition, in this embodiment of the present application, node information of the newly registered edge node sent by the node proxy component in the newly registered edge node may also be acquired; and the node information may be added to the cluster node list. The node information includes a service discovery port of the node proxy component; and correspondingly, the node proxy component accesses each edge node in the current cluster based on the service discovery port of the node proxy component of each edge node in the cluster node list. Further, the node information also includes a unique identifier of a node.

Among them, the node proxy component in the newly registered edge node monitors a configured local service discovery port, and configures a local iptables rule to direct flows of a K8S service network segment to a local node proxy component, connects to a public network IP exposed by a cloud proxy component at the same time, establishes a long link channel to the cloud proxy component, generates a unique identifier of this node, and reports this node information to the cloud proxy component. In response to the cloud proxy component discovering that a new node is registered, it records new node information, issues an existing node list in a cluster to a node proxy component of this node at the same time, and triggers an automatic discovery process of this node. The node proxy component of the newly registered node receives the current cluster node list, enters the automatic discovery process, and tries to initiate direct access by using a service discovery port of IP+edge proxy component of each node. At this point, nodes in the same local area network may return normal responses, while nodes that are not in the same local area network may not be directly connected.

It should be pointed out that k8s (Kubernetes) is an open-source container cluster management system of Google. Based on a Docker technology, a series of complete functions, such as deployment and operation, resource scheduling, service discovery and dynamic scaling, are provided for containerized applications, thereby improving the convenience of large-scale container cluster management. Service is a resource type in a k8s cluster, by using the service type resource, it may provide a domain-name-based access address for pods in the k8s cluster and provide simple four-layer load balancing capabilities.

Figure 3:
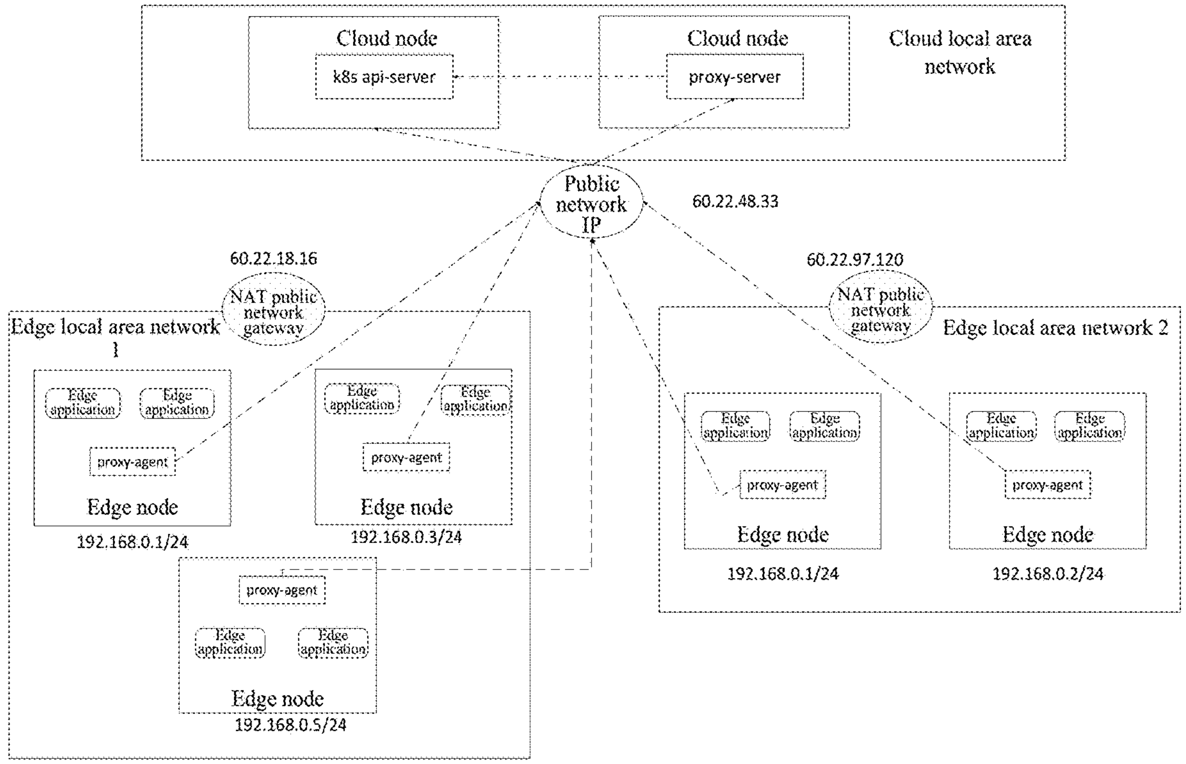
FIG. 3 is a schematic diagram of a component deployment architecture provided by the present application.
Figure 4:
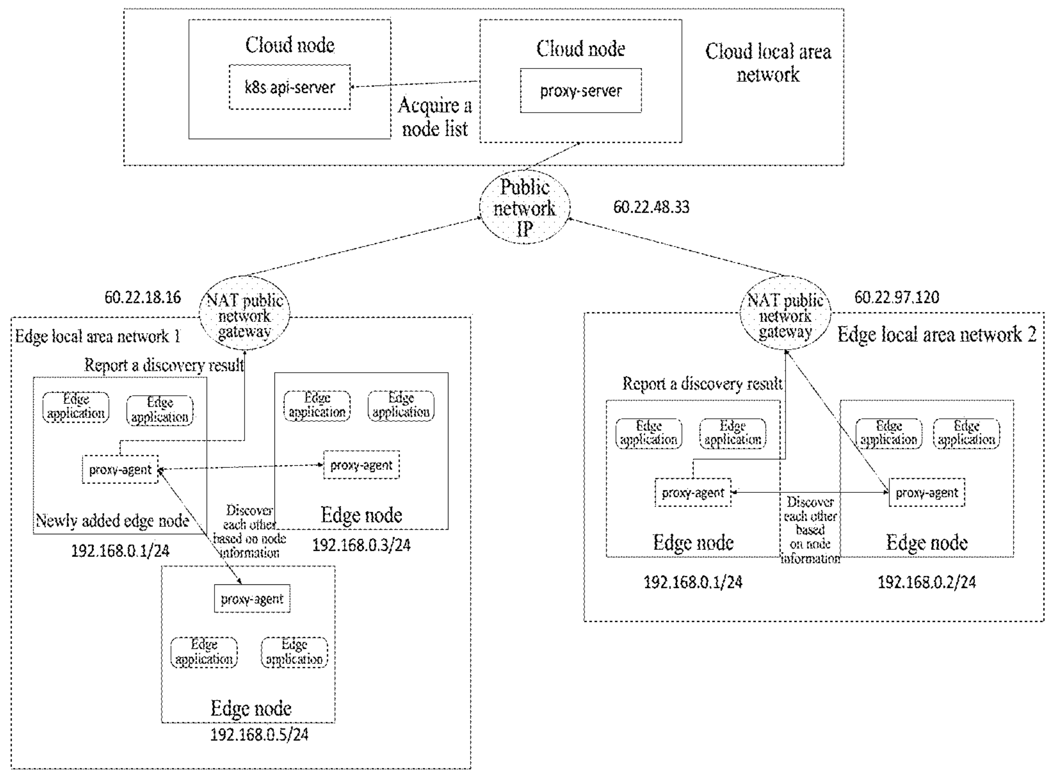
FIG. 4 is a schematic diagram of node discovery of a newly registered node provided by the present application.

For example, as shown in FIG. 3, FIG. 3 is a schematic diagram of a component deployment architecture provided by an embodiment of the present application. An edge local area network 1 and an edge local area network 2 are taken as examples, but the number of the local area networks is not limited. The present application mainly includes two types of components, which are operated on a cloud node and an edge computing node of the k8s cluster that carries an edge computing service, respectively. The details are as follows: a proxy-server (i.e., the cloud proxy component), which is operated in the form of deployment on the cloud node of the k8s cluster, communicates with a cluster api-server, exposes services to the outside through a public network IP, and has main functions including maintaining the node information, generating and updating a global routing table according to the node discovery result, issuing the global routing table to a proxy-agent (i.e., the node proxy component), performing UDP hole punching between the local area networks, and performing relay flow forwarding. The proxy-agent is operated on the edge computing node in the form of daemonset. Each edge node operates an instance, and has main functions including node information registration, local area network node discovery, local iptables rule configuration, and classification and forwarding based on the global routing table. After the edge node is powered on and joins a cluster, the proxy-agent on the node will be automatically powered on to monitor a configured local service discovery port, configure a local iptables rule to direct flows of a service network segment to a local proxy-agent, connect to a public network IP exposed by a cloud proxy-server at the same time, establish a long link channel to the proxy-server, generate a unique id of this node, and report this node information to the cloud proxy-server. In response to the cloud proxy-server discovering that a new node is registered, it records new node information, issues an existing node list in a cluster to a proxy-agent of this node at the same time, and triggers an automatic discovery process of this node. The proxy-agent of the new node receives the current global node list, enters the automatic discovery process, and tries to initiate direct access by using a service discovery port of IP+proxy-agent of each node. Nodes in the same local area network may return normal responses, but nodes that are not in the same local area network may not be directly connected, and then a view of the current new node and those existing node in a network reachable domain may be obtained. As shown in FIG. 4, FIG. 4 is a schematic diagram of node discovery of a newly registered node provided by an embodiment of the present application. The edge local area network 1 and the edge local area network 2 are taken as examples, but the number of the local area networks is not limited.

Step S12: in response to the node discovery result indicating that no node is discovered, performing a UDP hole punching operation between a local area network where the newly registered edge node is located and the current existing local area network to obtain an intercommunication relationship between the local area networks, and updating the global routing table based on the intercommunication relationship.

In an implementation, further, in this embodiment of the present application, a public network NAT (Network Address Translation) gateway address of the local area network where the newly registered edge node is located may also be acquired; and local area network information of this local area network is created based on the public network NAT gateway address and the node information of the newly registered edge node. In addition, the UDP hole punching operation between the local area network where the newly registered edge node is located and the current existing local area network is performed based on the public network NAT gateway address to obtain the intercommunication relationship between the local area networks.

The global routing table includes local area network information of each local area network in the cluster and the intercommunication relationships between the local area networks. The local area network information includes each node information in the present local area network.

Figure 5:
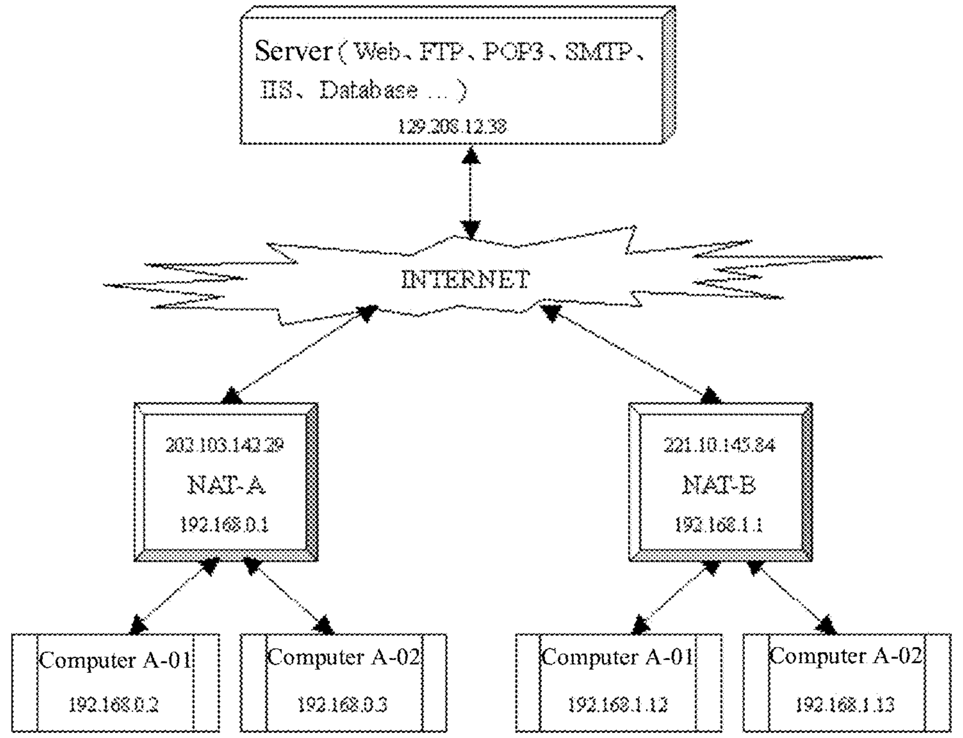
FIG. 5 is a NAT schematic diagram provided by the present application.

It should be pointed out that NAT is an IETF (Internet Engineering Task Force) standard, which allows an entire organization to appear on the Internet with a public network IP (Internet Protocol) address, and is a technology that translates an internal private network address (i.e., an IP address) into a legitimate network IP address. NAT solves the problem of insufficient IPv4 addresses, and further shields real addresses of private network users, thereby improving the security of the private network users. In a typical NAT networking model, a network is usually divided into two parts: a private network and a public network, each using an independent address space. As shown in FIG. 5, a private address is used for the private network, while a public network address is used for the public network. In order to allow hosts A-01 and A-02 in the private network to access a server on the Internet, a NAT device needs to be deployed at a network boundary to perform address translation. The NAT device is usually a router or a firewall.

Step S13: in response to the node discovery result indicating that a node is successfully discovered, associating node information of the newly registered edge node with target local area network information to update the global routing table, wherein the target local area network information is local area network information of a local area network where a successfully discovered node is located.

Figure 6:
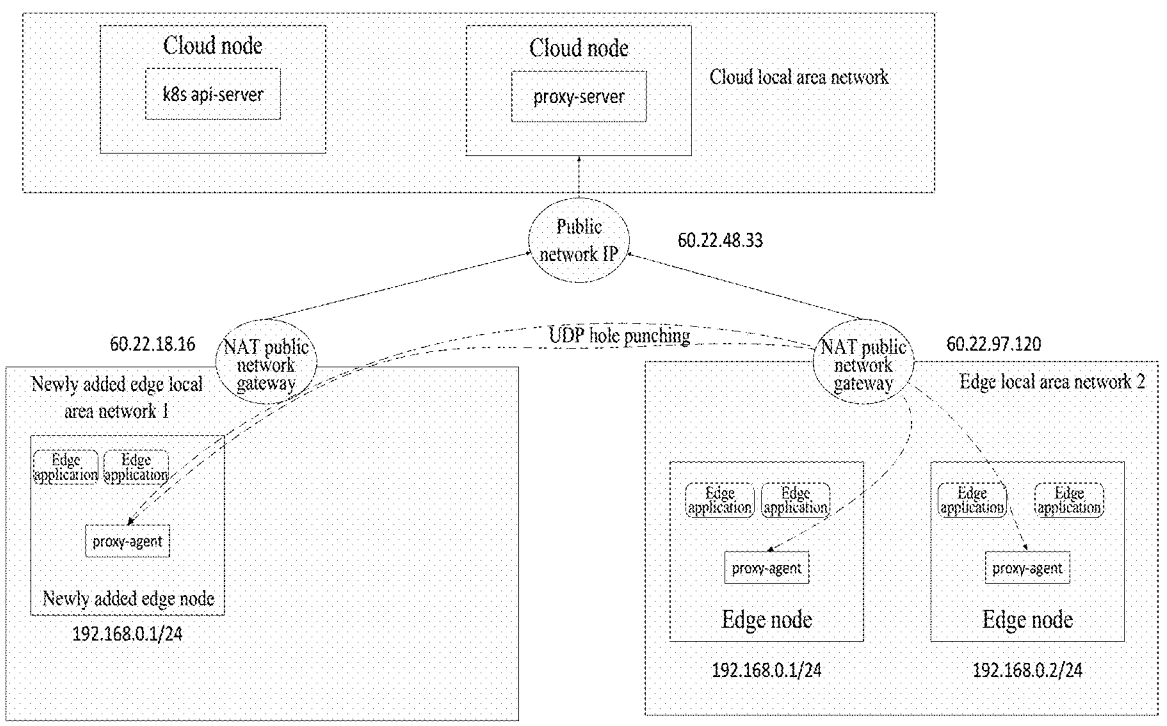
FIG. 6 is a schematic diagram of UDP hole punching of a newly added edge local area network provided by the present application.
Figure 7:
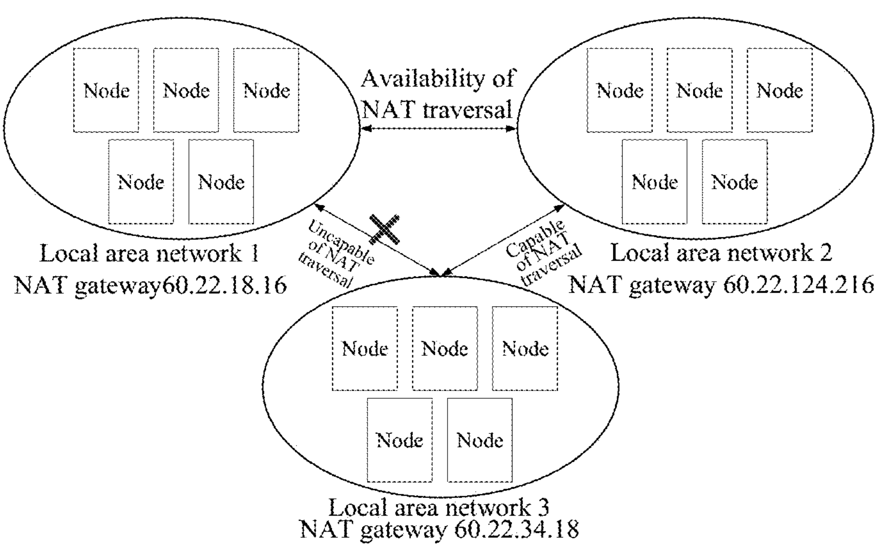
FIG. 7 is a schematic diagram of a global routing table provided by the present application.

It should be pointed out that in response to the newly registered node being not in the same local area network as any other node, a new local area network and nodes have appeared, and the proxy-agent sends the node discovery result to the cloud proxy-server. In response to the cloud proxy-server receiving the node discovery result indicating a newly added node appearing on the existing local area network, the node information is associated with existing local area network information, and the global routing table is updated and issued to all proxy-agents. In response to the cloud proxy-server receiving the node discovery result indicating a newly added node appearing on a brand-new local area network, a piece of local area network information is newly created, a public network NAT gateway address of this local area network is acquired, and the UDP hole punching operation is tried to be performed with the proxy-agent on other existing local area network nodes through the public network NAT gateway. For example, as shown in FIG. 6, an embodiment of the present application provides a schematic diagram of UDP hole punching of a newly added edge local area network provided by an embodiment of the present application. The UDP hole punching is performed between a newly added edge local area network 1 and the edge local area network 2. In response to the newly added local area network being not accessed through UDP hole punching, in this embodiment of the present application, a long link channel of the proxy-agent of this node may be maintained in the cloud proxy-server, and a subsequent flow to the local area network may be forwarded to the long link channel of the corresponding node through the cloud proxy-server. Based on the UDP hole punching result, the cloud proxy-server maintains the intercommunication information between the newly added local area network and other local area networks and node information contained therein, generates a global routing table, and issues the global routing table to all proxy-agents. As shown in FIG. 7, FIG. 7 is a schematic diagram of a global routing table provided by an embodiment of the present application. Taking the local area network 1, the local area network 2 and the local area network 3 as examples, the global routing table includes local area network information of each local area network and intercommunication relationships between the local area networks. The local area network information includes each node information in the present local area network, and a NAT gateway address. That is, the generated global routing table describes the intercommunication information between nodes in the edge computing cluster, including availability of direct intercommunication, availability of intercommunication through UDP hole punching, unavailability of intercommunication through UDP hole punching, and availability of direct intercommunication of nodes in the same local area network.

Step S14: issuing the global routing table to a node proxy component in each edge node, so that the node proxy component in each edge node forwards an application access flow based on the global routing table to realize application access.

In response to the node proxy component in each edge node determining based on the global routing table that a local area network where a local node is located and a local area network where a destination node is located are of the same local area network, the application access flow is directly forwarded to a node proxy component in the destination node, so that the node proxy component in the destination node forwards the application access flow to a destination application.

In an implementation, in response to the node proxy component in each edge node determining based on the global routing table that an intercommunication relationship between the local area network where the local node is located and the local area network where the destination node is located may be capable of intercommunication through UDP hole punching, the application access flow is forwarded to the node proxy component in the destination node through a NAT gateway of the local area network where the destination node is located, so that the node proxy component in the destination node forwards the application access flow to the destination application.

In addition, this embodiment of the present application further includes: maintaining a long link with the node proxy component in each edge node; acquiring an application access flow sent by a target node proxy component based on the long link, and forwarding the application access flow to the node proxy component in the destination node, so that the node proxy component in the destination node forwards the application access flow to the destination application, wherein the target node proxy component is a node proxy component that determines based on the global routing table that the intercommunication relationship between the local area network where the local node is located and the local area network where the destination node is located may be uncapable of intercommunication through UDP hole punching.

That is, in this embodiment of the present application, an inter-access flow between edge node applications is proxied by using the edge node agent, the network reachability between nodes is automatically detected by the edge node agent, and global routing information is generated. The cloud proxy-server is used for UDP hole punching across the networks to achieve traversal of application flow. When UDP hole punching may not be achieved, the cloud proxy-server is used to relay a flow of the proxy edge application across the networks. The cloud proxy-server monitors addition/deletion information of a node, timely updates the global routing table of the node, and issues the global routing table to an edge agent. The edge agent selects an optimal routing path based on the global routing table of the node to forward an application flow. Through the solution provided in the embodiment of the present application, service discovery and inter-access between applications of the edge computing cluster across local area networks may be performed through a k8s service, with the experience being the same as that of the ordinary fully connected cluster. Three scenarios of application access are described below in detail by taking the previously generated global routing table as an example.

Figure 8:
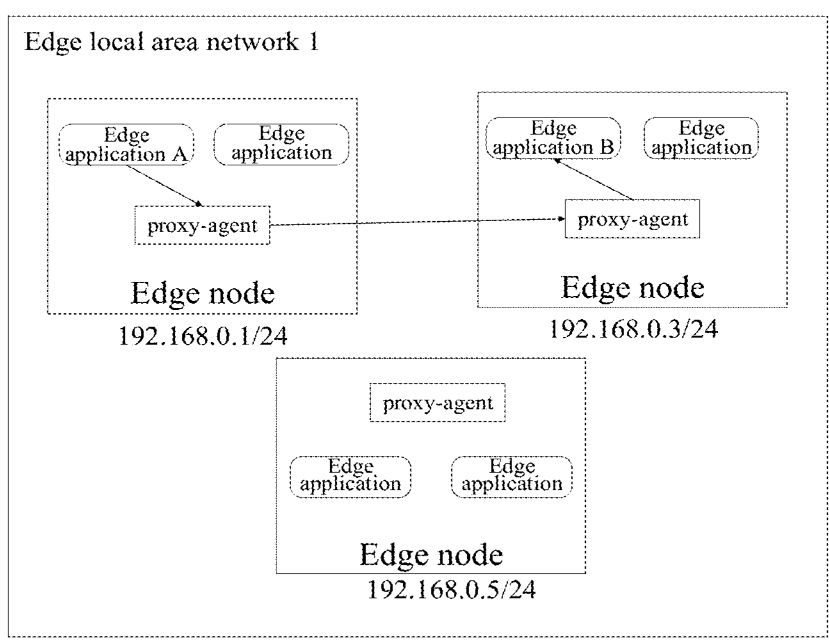
FIG. 8 is a schematic diagram of application access in the same local area network provided by the present application.

(1) An application A normally requests an application B through the k8s service, and a node where the application A is located and a node where the application B is located are in the same local area network and may communicate directly. In this case, a request is sent from a pod of the application A, and is forwarded through iptables into a proxy-agent on the node where A is located. The proxy-agent determines that the node where the target application B is located may be reached directly according to the global routing table, and forwards a flow directly to a proxy-agent port on the node where B is located. The proxy-agent on the node where B is located forwards the flow to the application B, and a response from the application B is returned along this path. As shown in FIG. 8, FIG. 8 is a schematic diagram of application access in the same local area network provided by an embodiment of the present application. An edge application A and an edge application B are both in the edge local area network 1.

Figure 9:
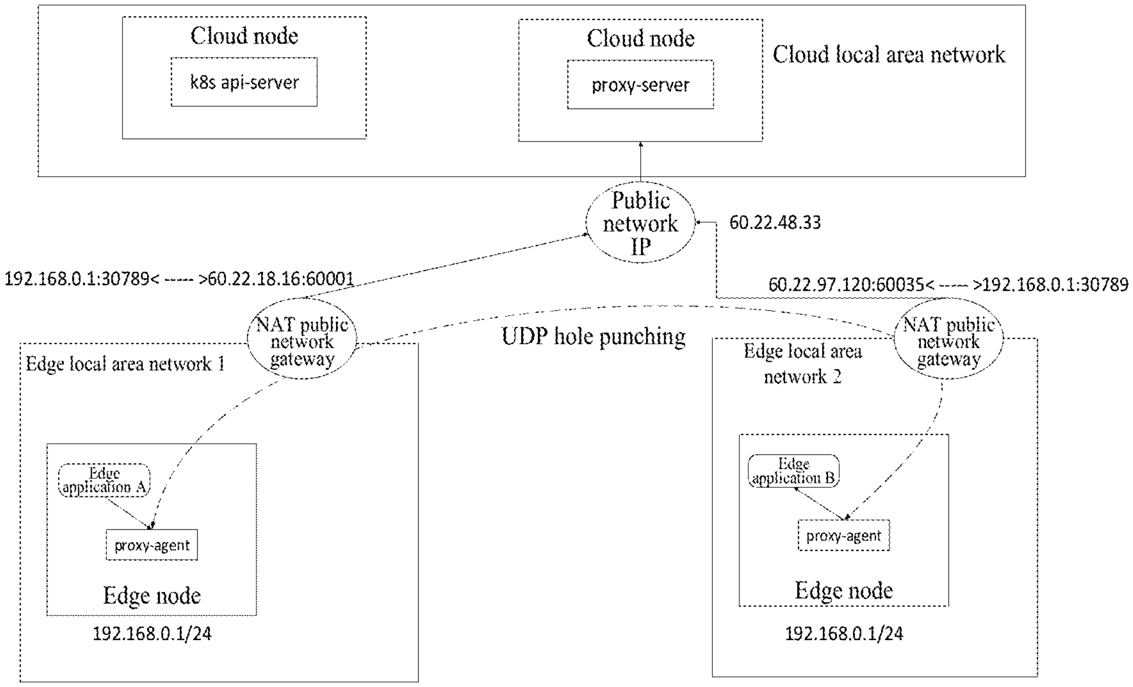
FIG. 9 is a schematic diagram of application access through UDP hole punching across local area networks provided by the present application.

(2) The application A normally requests the application B through the k8s service, and a node where the application A is located and a node where the application B is located are not in the same local area network, but the two local area networks may access each other through UDP hole punching. In this case, a request is sent from a pod of the application A, and is forwarded through iptables into a proxy-agent on the node where A is located. The proxy-agent determines according to the global routing table that the node where the target application B is located may be accessed through UDP hole punching, forwards a flow to a public network IP and a port of a corresponding node exposed on a NAT gateway of the local area network where B is located, forwards the flow to a proxy-agent port on the node where B is located through the NAT gateway of the local area network where B is located. The proxy-agent on the node where B is located forwards the flow to the application B, and a response from the application B is returned along this path. In this case, the flow between the application A and the application B is directly forwarded to each other through the NAT gateways of both parties, without going through the cloud proxy-server, which may avoid the bottleneck in forwarding performance caused by the flow passing through the cloud. As shown in FIG. 9, FIG. 9 is a schematic diagram of application access through UDP hole punching across local area networks provided by an embodiment of the present application. The edge application A is located in the edge local area network 1, and the edge application B is located in the edge local area network 2.

Figure 10:
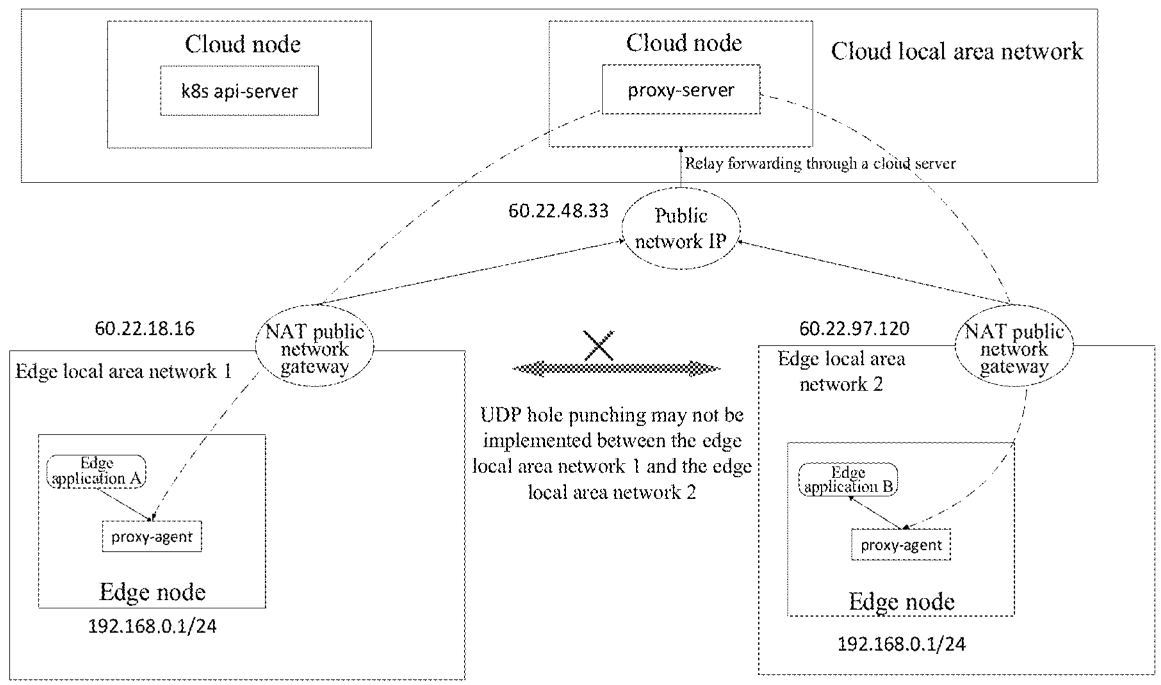
FIG. 10 is a schematic diagram of application access through a cloud proxy component across local area networks provided by the present application.

(3) The application A normally requests the application B through the k8s service, and the node where the application A is located and the node where the application B is located are not in the same local area network, and the two local area networks may not access each other either through UDP hole punching. In this case, a request is sent from a pod of the application A, and is forwarded through iptables into a proxy-agent on the node where A is located. The proxy-agent determines according to the global routing table that the node where the target application B is located may be not accessed through UDP hole punching, forwards a flow to the cloud proxy-server, the cloud proxy-server forwards the flow into a long link corresponding to the proxy-agent of the node where B is located. The proxy-agent on the node where B is located forwards the flow to the application B, and a response from the application B is returned along this path. In this case, the flow needs to be relayed through a cloud proxy server, which may solve the problem of cross-network communication in a UDP hole punching scenario that may not be realized due to a NAT firewall rule. Referring to FIG. 10, FIG. 10 is a schematic diagram of application access through a cloud proxy component across local area networks provided by an embodiment of the present application. The edge application A is located in the edge local area network 1, and the edge application B is located in the edge local area network 2.

In this way, the problem of inter-access of applications across the local area networks in the edge computing scenario is solved. The applications may access each other across the local area networks through the native k8s service, node-based global routing information may be automatically generated, and the optimal routing path may be automatically selected by distributed node proxies, thereby reducing the load of centralized traffic proxies. It is also possible to use centralized proxies for flow forwarding in scenarios where the edge nodes are located behind stricter firewalls, thereby improving the compatibility with the edge computing scenario and providing a high utility value.

Therefore, in this embodiment of the present application, the node discovery result is acquired first, the node discovery result is a node discovery result obtained by the node proxy component in the newly registered edge node to perform node discovery on each edge node in the current cluster. In response to the node discovery result indicating that no node is discovered, the UDP hole punching operation between the local area network where the newly registered edge node is located and the current existing local area network is performed to obtain the intercommunication relationship between the local area networks, and the global routing table is updated based on the intercommunication relationship. In response to the node discovery result indicating that a node is successfully discovered, the node information of the newly registered edge node is associated with target local area network information to update the global routing table, the target local area network information is local area network information of a local area network where the successfully discovered node is located. The global routing table is issued to the node proxy component in each edge node, so that the node proxy component in each edge node forwards an application access flow based on the global routing table to realize application access. That is, in the present application, the node discovery result of the edge node may be acquired during edge node registration, and the global routing table is updated based on the node discovery result, and then issued to the node proxy component of each edge node, so that when an application in each edge node is accessed across nodes, the node proxy component forwards an application flow based on the global routing table, which reduces a load of centralized flow proxies while application access across the edge nodes is realized.

Figure 11:
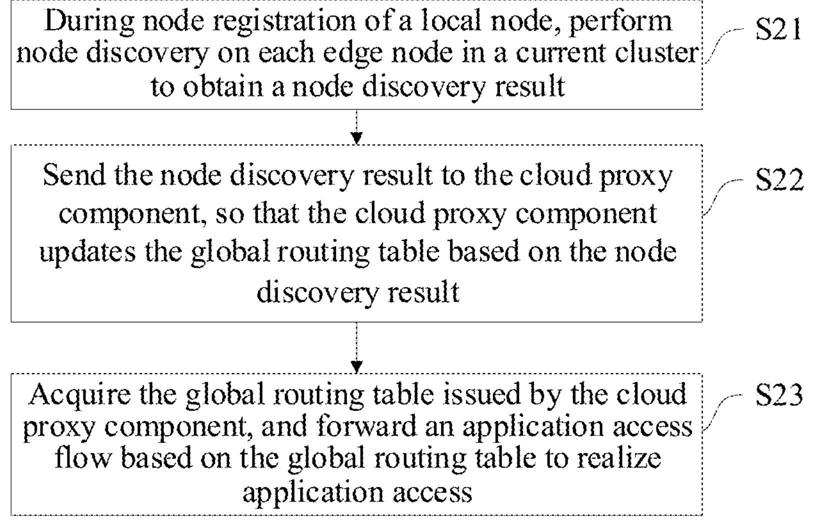
FIG. 11 is a flow chart of an application access method provided by the present application.

As shown in FIG. 11, an embodiment of the present application discloses an application access method, which is applied to a cloud proxy component and includes the following steps.

Step S21: during node registration of a local node, performing node discovery on each edge node in a current cluster to obtain a node discovery result.

Step S22: sending the node discovery result to a cloud proxy component, so that the cloud proxy component updates a global routing table based on the node discovery result, wherein in response to the node discovery result indicating that no node is discovered, the cloud proxy component performs a UDP hole punching operation between a local area network where a newly registered edge node is located and the current existing local area network to obtain an intercommunication relationship between the local area networks, and updates the global routing table based on the intercommunication relationship; in response to the node discovery result indicating that a node is successfully discovered, the cloud proxy component associates node information of the newly registered edge node with target local area network information to update the global routing table, the target local area network information is local area network information of a local area network where the successfully discovered node is located.

Step S23: acquiring the global routing table issued by the cloud proxy component, and an application access flow is forwarded based on the global routing table to realize application access.

The implementation process of the steps S21 to S23 may refer to the content disclosed in the above-mentioned embodiment, and will not be repeated here.

Figure 12:
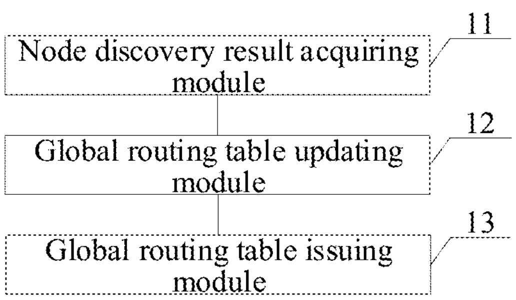
FIG. 12 is a schematic structural diagram of a cloud proxy component provided by the present application.

As shown in FIG. 12, an embodiment of the present application discloses a cloud proxy component, which includes:

a node discovery result acquiring module 11, configured to acquire a node discovery result, wherein the node discovery result is a node discovery result obtained by a node proxy component in a newly registered edge node to perform node discovery on each edge node in a current cluster;

a global routing table updating module 12, configured to, in response to the node discovery result indicating that no node is discovered, perform a UDP hole punching operation between a local area network where the newly registered edge node is located and the current existing local area network to obtain an intercommunication relationship between the local area networks, and update a global routing table based on the intercommunication relationship; and in response to the node discovery result indicating that a node is successfully discovered, associate node information of the newly registered edge node with target local area network information to update the global routing table, wherein the target local area network information is local area network information of a local area network where the successfully discovered node is located; and a global routing table issuing module 13, configured to issue the global routing table to a node proxy component in each edge node, so that the node proxy component in each edge node forwards an application access flow based on the global routing table to realize application access.

Therefore, in this embodiment of the present application, the node discovery result is acquired first, the node discovery result is a node discovery result obtained by the node proxy component in the newly registered edge node to perform node discovery on each edge node in the current cluster. In response to the node discovery result indicating that no node is discovered, the UDP hole punching operation between the local area network where the newly registered edge node is located and the current existing local area network is performed to obtain the intercommunication relationship between the local area networks, and the global routing table is updated based on the intercommunication relationship. In response to the node discovery result indicating that a node is successfully discovered, the node information of the newly registered edge node is associated with target local area network information to update the global routing table, the target local area network information is local area network information of the local area network where the successfully discovered node is located. The global routing table is issued to the node proxy component in each edge node, so that the node proxy component in each edge node forwards an application access flow based on the global routing table to realize application access. That is, in the present application, the node discovery result of the edge node may be acquired during edge node registration, and the global routing table is updated based on the node discovery result, and then issued to the node proxy component of each edge node, so that when an application in each edge node is accessed across nodes, the node proxy component forwards an application flow based on the global routing table, which reduces a load of centralized flow proxies while application access across the edge nodes is realized.

Further, the cloud proxy component further includes:

a cluster node list issuing module, configured to issue a cluster node list to the node proxy component in the newly registered edge node, so that the node proxy component performs node discovery on each edge node in the current cluster based on the cluster node list, to obtain the node discovery result.

Further, the cloud proxy component further includes:

a node information acquiring module, configured to acquire node information of the newly registered edge node sent by the node proxy component in the newly registered edge node; and a cluster node list maintaining module, configured to add the node information to the cluster node list.

The node information includes a service discovery port of the node proxy component; and correspondingly, the node proxy component accesses each edge node in the current cluster based on the service discovery port of the node proxy component of each edge node in the cluster node list.

In an implementation, in response to the node discovery result indicating that no node is discovered, the cloud proxy component further includes:

a public network NAT gateway address acquiring module, configured to acquire a public network NAT gateway address of the local area network where the newly registered edge node is located; and a local area network information creating module, configured to create local area network information of the local area network based on the public network NAT gateway address and the node information of the newly registered edge node.

In addition, in the implementation, in response to the node proxy component in each edge node determining based on the global routing table that a local area network where a local node is located and a local area network where a destination node is located are of the same local area network, the application access flow is directly forwarded to the node proxy component in the destination node, so that the node proxy component in the destination node forwards the application access flow to a destination application; and in response to the node proxy component in each edge node determining based on the global routing table that an intercommunication relationship between the local area network where the local node is located and the local area network where the destination node is located may be capable of intercommunication through UDP hole punching, the application access flow is forwarded to the node proxy component in the destination node through a NAT gateway of the local area network where the destination node is located, so that the node proxy component in the destination node forwards the application access flow to the destination application.

Further, the cloud proxy component further includes:

a long link maintaining module, configured to maintain a long link with the node proxy component in each edge node;

an application access flow acquiring module, configured to acquire an application access flow sent by a target node proxy component based on the long link, and forward the application access flow to the node proxy component in the destination node, so that the node proxy component in the destination node forwards the application access flow to the destination application;

wherein the target node proxy component is a node proxy component that determines based on the global routing table that the intercommunication relationship between the local area network where the local node is located and the local area network where the destination node is located may be uncapable of intercommunication through UDP hole punching.

Figure 13:
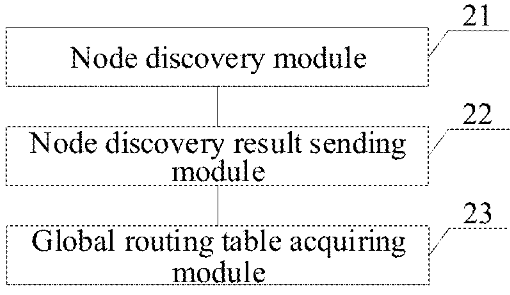
FIG. 13 is a schematic structural diagram of a node proxy component provided by the present application.

As shown in FIG. 13, an embodiment of the present application discloses a node proxy component and includes:

a node discovery module 21, configured to, during node registration of a local node, perform node discovery on each edge node in a current cluster to obtain a node discovery result;

a node discovery result sending module 22, configured to send the node discovery result to the cloud proxy component, so that the cloud proxy component updates a global routing table based on the node discovery result, wherein in response to the node discovery result indicating that no node is discovered, the cloud proxy component performs a UDP hole punching operation between a local area network where a newly registered edge node is located and the current existing local area network to obtain an intercommunication relationship between the local area networks, and updates the global routing table based on the intercommunication relationship; and in response to the node discovery result indicating that a node is successfully discovered, associate node information of the newly registered edge node with target local area network information to update the global routing table, wherein the target local area network information is local area network information of a local area network where the successfully discovered node is located; and a global routing table acquiring module 23, configured to acquire the global routing table issued by the cloud proxy component, and forward an application access flow based on the global routing table to realize application access.

Therefore, according to this embodiment of the present application, node discovery is performed on each edge node in the current cluster during node registration node in the local node to obtain the node discovery result. Then, the node discovery result is sent to the cloud proxy component, so that the cloud proxy component updates the global routing table based on the node discovery result, wherein in response to the node discovery result indicating that no node is discovered, the cloud proxy component performs the UDP hole punching operation between the local area network where the newly registered edge node is located and the current existing local area network to obtain the intercommunication relationship between the local area networks, and updates the global routing table based on the intercommunication relationship; and in response to the node discovery result indicating that a node is successfully discovered, the cloud proxy component associates node information of the newly registered edge node with target local area network information to update the global routing table, wherein the target local area network information is local area network information of a local area network where the successfully discovered node is located. Finally, the global routing table issued by the cloud proxy component is acquired, and the application access flow is forwarded based on the global routing table to realize application access. That is, in the present application, edge node discovery may be performed during edge node registration, and the cloud proxy component updates the global routing table based on the node discovery results, and then issues the global routing table to the node proxy component of each edge node, so that when an application in each edge node is accessed across the nodes, the node proxy component forwards an application flow based on the global routing table, which reduces a load of centralized traffic proxies while application access across the edge nodes is realized.

Figure 14:
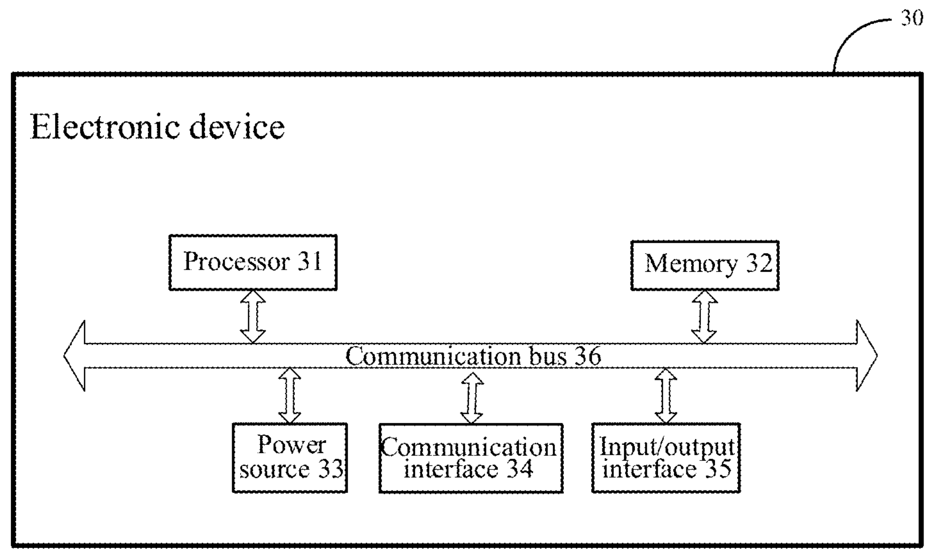
FIG. 14 is a structural diagram of an electronic device provided by the present application.

As shown in FIG. 14, an embodiment of the present application discloses an electronic device 30, including a processor 31 and a memory 32. The memory 32 is configured to store a computer program. The processor 31 is configured to execute the computer program to implement the application access method disclosed by the foregoing embodiment.

The process of the above-mentioned application access method may refer to the corresponding content disclosed in the foregoing embodiment, and will not be repeated here.

In addition, the memory 32 is used as a carrier of resource storage, which may be a read-only memory, a random memory, a magnetic disk, a compact disc, etc. . . . , and a storage mode may be temporary storage or permanent storage.

In addition, the electronic device 30 also includes a power source 33, a communication interface 34, an input/output interface 35 and a communication bus 36. The power source 33 is configured to supply a working voltage for each hardware device on the electronic device 30. The communication interface 34 is capable of creating a data transmission channel for the electronic device 30 and an external device, and follows a communication protocol that is an arbitrary communication protocol that may be applicable to the technical solutions of the present application, which will not be limited herein. The input/output interface 35 is configured to acquire external input data or output data to the outside, and its interface type may be selected according to the needs of the applications, which will not be limited.

Further, an embodiment of the present application further discloses a non-transitory computer-readable storage medium configured to store a computer program therein, wherein the computer program, when being executed by a processor, implements the application access method disclosed by the foregoing embodiment.

The process of the above-mentioned application access method may refer to the corresponding content disclosed in the foregoing embodiment, and will not be repeated here.

The various embodiments in this specification are described in a progressive manner, and each embodiment focuses on the differences from other embodiments. The same or similar parts between each embodiment may be referred to each other. For the device disclosed in the embodiments, as it corresponds to the method disclosed in the embodiments, the description is relatively simple. Please refer to the method section for relevant information.

The steps of the method or algorithm described in conjunction with the disclosed embodiments in this specification may be directly implemented using hardware, software modules executed by processors, or a combination of both. Software modules may be placed in random access memory (RAM), memory, read-only memory (ROM), electrically programmable ROM, electrically erasable programmable ROM, registers, hard drives, removable disks, CD-ROM, or any other form of storage medium known in the technical field.

The above provides a detailed introduction to the application access method, the cloud proxy component, the node proxy component, the device, and medium provided in the present application. Some examples are used in this specification to explain the principles and implementation methods of the present application. The above examples are only used to help assistants understand the methods and core ideas of the present application; meanwhile, for persons skilled in the art, there may be changes in implementation methods and application scope based on the ideas of the present application. Therefore, the content of this specification should not be understood as a limitation on the present application.

The invention claimed is:

1. An application access method, applied to a cloud proxy component, wherein the application access method comprises:

acquiring a node discovery result, wherein a current cluster comprises edge nodes, a newly registered edge node is an edge node newly registered to the current cluster, the newly registered edge node and an edge node that are located in a same local area network are capable to access each other, the newly registered edge node and an edge node that are not located in the same local area network are unable to be directly connected; the node discovery result is a node discovery result obtained by a node proxy component in the newly registered edge node to perform node discovery on each edge node in the current cluster, to determine whether there is a node located in the same local area network as the newly registered edge node;

in response to the node discovery result indicating that no node located in the same local area network as the newly registered edge node is discovered, performing a user datagram protocol (UDP) hole punching operation between a local area network where the newly registered edge node is located and a current existing local area network to obtain an intercommunication relationship between local area networks, and updating a global routing table based on the intercommunication relationship;

in response to the node discovery result indicating that a node located in the same local area network as the newly registered edge node is successfully discovered, associating node information of the newly registered edge node with target local area network information to update the global routing table, wherein the target local area network information is local area network information of a local area network where a successfully discovered node is located; and issuing the global routing table to a node proxy component in each edge node of the edge nodes in the current cluster, so that the node proxy component in each edge node forwards an application access flow based on the global routing table to realize application access;

wherein before acquiring the node discovery result, the application access method further comprises: issuing a cluster node list to the node proxy component in the newly registered edge node, so that the node proxy component in the newly registered edge node performs node discovery on each edge node in the current cluster based on the cluster node list, to obtain the node discovery result.

2. The application access method according to claim 1, further comprising:

acquiring the node information of the newly registered edge node sent by the node proxy component in the newly registered edge node; and adding the node information to the cluster node list.

3. The application access method according to claim 2, wherein the node information comprises a service discovery port of the node proxy component in the newly registered edge node; and the node proxy component in the newly registered edge node accesses each edge node in the current cluster based on a service discovery port of the node proxy component of each edge node in the cluster node list.

4. The application access method according to claim 3, wherein the node information further comprises a unique identifier of a node.

5. The application access method according to claim 1, wherein in response to the node discovery result indicating that no node located in the same local area network as the newly registered edge node is discovered, the application access method further comprises:

acquiring a public network network address translation (NAT) gateway address of the local area network where the newly registered edge node is located; and creating local area network information of the local area network where the newly registered edge node is located based on the public network NAT gateway address and the node information of the newly registered edge node.

6. The application access method according to claim 1, wherein in response to the node proxy component in each edge node of the edge nodes in the current cluster determining based on the global routing table that a local area network where a local node is located and a local area network where a destination node is located are of the same local area network, the application access flow is directly forwarded to a node proxy component in the destination node, so that the node proxy component in the destination node forwards the application access flow to a destination application; and in response to the node proxy component in each edge node of the edge nodes in the current cluster determining based on the global routing table that an intercommunication relationship between the local area network where the local node is located and the local area network where the destination node is located is capable of intercommunication through UDP hole punching, the application access flow is forwarded to the node proxy component in the destination node through a NAT gateway of the local area network where the destination node is located, so that the node proxy component in the destination node forwards the application access flow to the destination application.

7. The application access method according to claim 1, further comprising:

maintaining a long link with the node proxy component in each edge node of the edge nodes in the current cluster.

8. The application access method according to claim 7, further comprising:

acquiring an application access flow sent by a target node proxy component based on the long link, and forwarding the application access flow sent by the target node proxy component to a node proxy component in a destination node, so that the node proxy component in the destination node forwards the application access flow sent by the target node proxy component to a destination application;

wherein the target node proxy component is a node proxy component that determines based on the global routing table that the intercommunication relationship between a local area network where a local node is located and a local area network where the destination node is located is uncapable of intercommunication through UDP hole punching.

9. The application access method according to claim 1, further comprising:

monitoring addition/deletion information of each edge node of the edge nodes in the current cluster and updating the global routing table of each edge node; and issuing an updated global routing table of each edge node to the node proxy component in each edge node.

10. The application access method according to claim 1, wherein the global routing table comprises local area network information of each local area network in a cluster and the intercommunication relationship between the local area networks, and the local area network information of each local area network in the cluster comprises each node information in each local area network in the cluster.

11. A non-transitory computer-readable storage medium, configured to store a computer program therein, wherein the computer program, when being executed by a processor, implementing the application access method according to claim 1.

12. An application access method, applied to a node proxy component, wherein the application access method comprises:

during node registration of a local node, performing node discovery on each edge node in a current cluster to obtain a node discovery result, to determine whether there is a node located in a same local area network as a newly registered edge node; wherein the current cluster comprises edge nodes, the newly registered edge node is an edge node newly registered to the current cluster, the newly registered edge node and an edge node that are located in the same local area network are capable to access each other, the newly registered edge nodes and an edge node that are not located in the same local area network are unable to be directly connected;

sending the node discovery result to a cloud proxy component, so that the cloud proxy component updates a global routing table based on the node discovery result, wherein in response to the node discovery result indicating that no node located in the same local area network as the newly registered edge node is discovered, the cloud proxy component performs a user datagram protocol (UDP) hole punching operation between a local area network where a newly registered edge node is located and a current existing local area network to obtain an intercommunication relationship between local area networks, and updates the global routing table based on the intercommunication relationship; in response to the node discovery result indicating that a node located in the same local area network as the newly registered edge node is successfully discovered, the cloud proxy component associates node information of the newly registered edge node with target local area network information to update the global routing table, the target local area network information is local area network information of a local area network where a successfully discovered node is located; and acquiring the global routing table issued by the cloud proxy component, and forwarding an application access flow based on the global routing table to realize application access;

wherein the acquiring the global routing table issued by the cloud proxy component, and forwarding the application access flow based on the global routing table to realize application access comprises: receiving an application access flow sent by a first local application to a second application; selecting an application forwarding mode based on the global routing table; and sending the application access flow sent by the first local application to the second application through the application forwarding mode.

13. The application access method according to claim 12, wherein the sending the application access flow sent by the first local application to the second application through the application forwarding mode comprises:

in response to a node where the second application is located and the first local application being on the same local area network, directly forwarding the application access flow sent by the first local application to a node proxy component where the second application is located, so that a node proxy component of the second application forwards the application access flow sent by the first local application to the second application.

14. The application access method according to claim 12, wherein the sending the application access flow sent by the first local application to the second application through the application forwarding mode comprises:

in response to a node where the second application is located and the first local application being not on the same local area network and two local area networks access each otherthrough UDP hole punching, forwarding the application access flow sent by the first local application to a node proxy component of the second application through a NAT gateway of the local area network where the second application is located, so that the node proxy component of the second application forwards the application access flow sent by the first local application to the second application.

15. The application access method according to claim 12, wherein the sending the application access flow sent by the first local application to the second application through the application forwarding mode comprises:

in response to a node where the second application is located and the first local application being not on the same local area network and two local area networks do not access each other through UDP hole punching, forwarding the application access flow sent by the first local application to the cloud proxy component, so that the cloud proxy component forwards the application access flow sent by the first local application to a node proxy component of the node where the second application is located, and a node proxy component of the second application sends the application access flow sent by the first local application to the second application.

16. The application access method according to claim 12, further comprising:

monitoring a configured local service discovery port, and directing a flow generated by the configured local service discovery port to a local node proxy component.

17. The application access method according to claim 12, further comprising:

connecting a public network Internet Protocol (IP) exposed by the cloud proxy component, and establishing a long link channel to the cloud proxy component; and reporting local node information to the cloud proxy component.

18. An electronic device, comprising a processor and a memory, wherein the memory is configured to store a computer program; and the processor is configured to, when executing the computer program, implement operations comprising:

acquiring a node discovery result, wherein a current cluster comprises edge nodes, a newly registered edge node is an edge node newly registered to the current cluster, the newly registered edge node and an edge node that are located in a same local area network are capable to access each other, the newly registered edge node and an edge node that are not located in the same local area network are unable to be directly connected; the node discovery result is a node discovery result obtained by a node proxy component in the newly registered edge node to perform node discovery on each edge node in the current cluster, to determine whether there is a node located in the same local area network as the newly registered edge node;

in response to the node discovery result indicating that no node located in the same local area network as the newly registered edge node is discovered, performing a user datagram protocol (UDP) hole punching operation between a local area network where the newly registered edge node is located and a current existing local area network to obtain an intercommunication relationship between local area networks, and updating a global routing table based on the intercommunication relationship;

in response to the node discovery result indicating that a node located in the same local area network as the newly registered edge node is successfully discovered, associating node information of the newly registered edge node with target local area network information to update the global routing table, wherein the target local area network information is local area network information of a local area network where a successfully discovered node is located; and issuing the global routing table to a node proxy component in each edge node of the edge nodes in the current cluster, so that the node proxy component in each edge node forwards an application access flow based on the global routing table to realize application access;

wherein before the operation of acquiring the node discovery result, the operations further comprise: issuing a cluster node list to the node proxy component in the newly registered edge node, so that the node proxy component in the newly registered edge node performs node discovery on each edge node in the current cluster based on the cluster node list, to obtain the node discovery result.

* * * * *